US008037108B1

(12) United States Patent
Chang

(10) Patent No.: US 8,037,108 B1
(45) Date of Patent: Oct. 11, 2011

(54) CONVERSION OF RELATIONAL DATABASES INTO TRIPLESTORES

(75) Inventor: Walter Chang, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 287 days.

(21) Appl. No.: 12/507,746

(22) Filed: Jul. 22, 2009

(51) Int. Cl.
*G06F 17/30* (2006.01)

(52) U.S. Cl. ...................................... 707/803

(58) Field of Classification Search .......... 707/791, 707/793, 795, 796, 802, 803, 807, 810
See application file for complete search history.

(56) References Cited

U.S. PATENT DOCUMENTS

| 7,028,057 | B1* | 4/2006 | Vasudevan et al. | 707/695 |
|---|---|---|---|---|
| 7,809,763 | B2* | 10/2010 | Nori et al. | 707/802 |
| 7,836,028 | B1* | 11/2010 | Agarwal et al. | 707/695 |
| 2003/0023609 | A1* | 1/2003 | Della-Libera et al. | 707/101 |
| 2003/0229610 | A1* | 12/2003 | Van Treeck | 707/1 |
| 2005/0149484 | A1* | 7/2005 | Fox et al. | 707/1 |
| 2006/0230063 | A1* | 10/2006 | Pollinger | 707/103 Y |
| 2009/0164943 | A1* | 6/2009 | Ryan et al. | 715/810 |
| 2010/0083285 | A1* | 4/2010 | Bahat et al. | 719/328 |
| 2010/0228764 | A1* | 9/2010 | Sallakonda et al. | 707/769 |

OTHER PUBLICATIONS

An, Yuan et al., "Building Semantic Mappings From Databases To Ontologies", Jul. 18, 2006, *American Association for Artificial Intelligence*, 4 pages.
Barrasa, Jesús et al., "R$_2$O, an Extensible and Semantically Based Database-to-Ontology Mapping Language", 2004, *2$^{nd}$ International Workshop on Semantic Web and Databases*, 17 pages.
Bizer, Christian et al., "D2R Server—Publishing Relational Databases on the Semantic Web", Nov. 5-9, 2006, *5$^{th}$ International Semantic Web Conference*, Athens, Georgia, USA, 2 pages.
Bizer, Christian et al., "D2RQ—Treating Non-RDF Databases as Virtual RDF Graphs," Nov. 7-11, 2004, *3$^{rd}$ International Semantic Web Conference*, Hiroshima, Japan, 2 pages.
Bizer, Christian, D2R Map—A Database to RDF Mapping Language, May 20-24, 2003, *12$^{th}$ World Wide Web Conference*, Budapest, Hungary, 2 pages.
Brickley, Dan (Editor), "RDF Vocabulary Description Language 1.0: RDF Schema," Feb. 10, 2004, *W3C Recommendation*, 28 pages.
Chang, Walter W., "A Discussion of the Relationship Between RDF-Schema and UML", Aug. 4, 1998, *W3C Note*, 7 pages.

(Continued)

*Primary Examiner* — Cam-Linh Nguyen
(74) *Attorney, Agent, or Firm* — Fish & Richardson P.C.

(57) ABSTRACT

Methods, systems, and apparatus, including computer programs encoded on a computer storage medium, for converting a relational database into a triplestore. In one aspect, a method includes retrieving meta schema information for a relational database, including checking a data dictionary associated therewith, and saving the information (including column, primary key constraint and foreign key constraint definitions) in a canonical format; processing the saved information to identify triples to be created in a triplestore; and generating triples in the triplestore in accordance with results of the processing, the generating including: creating first triples (corresponding to data specified within relational database tables) using the column definitions, creating second triples (corresponding to data links between the relational database tables) using the primary key and foreign key constraint definitions, and creating third triples using a primary key constraint definition, a foreign key constraint definition, and an associative mapping table corresponding to the relational database.

20 Claims, 10 Drawing Sheets

OTHER PUBLICATIONS

Chen, Huajun et al., "Towards a Semantic Web of Relational Databases: a Practical Semantic Toolkit and an In-Use Case from Traditional Chinese Medicine," *International Semantic Web Conference*, 2006, pps. 750-763, 14 pages.

Chen, Peter Pin-Shan, "The Entity-Relationship Model—Toward a Unified View of Data", Mar. 1976, *ACM Transactions on Database Systems*, 28 pages.

De Laborda, Cristina Pérez, et al., "Relational.OWL—A Data and Schema Representation Format Based on OWL," 2005, *2nd Asia-Pacific Conference on Conceptual Modelling*, 8 pages.

Dou, Dejing et al., "Towards Populating and Querying the Semantic Web," 2006, *Proceedings of the 2nd ISWC*, 14 pages.

Korotkiy, Maksym et al., "From Relational Data to RDFS Models," 2004, *Proceedings of the International Conference on Web Engineering*, Munich, 14 pages.

Laclavik, Michael, "$RDB_2$Onto: Relational Database Data to Ontology Individuals Mapping," Sep. 26-28, 2006, *Tools for Acquisition, Organization and Presenting of Information and Knowledge*, P. Navrat et al (Eds), Workshop, 4 pages.

Nyulas, Csongor et al., "DataMaster—a Plug-In for Importing Schemas and Data From Relational Databases into Protégé," 2007, *Proceedings of $10^{th}$ International Protégé Conference*, 3 pages.

Rodriguez, Jesús Barrasa, "Upgrading Relational Legacy Data to the Semantic Web," May 23-26, 2006, World Wide Web Conference, Edinburg, Scotland, 2 pages.

Svihla, Martin et al., "Two Layer Mapping from Database to RDF", 2004, *Electronic Computers and Informatics*, 6 pages.

Xu, Zhuoming et al., "Mapping Between Relational Database Schema and OWL Ontology for Deep Annotation," Dec. 18-22, 2006, *Proceedings of the 2006 IEEE/WIC/AMC International Conference of Web Intelligence*, 5 pages.

\* cited by examiner

CONVERSION OF RELATIONAL DATABASES INTO TRIPLESTORES

BACKGROUND

This specification relates to conversion of data storage formats for large collections of data.

Large collections of data are often stored in databases. A database can be understood as a self-describing collection of integrated records. Different types of databases exist, but a commonly used type is the relational database. A relational database is a database that organizes data using common attributes found in the data set. The resulting "relations" or "tables" of organized data may then be systematically queried and manipulated using operators from a formal mathematical system such as a relational algebra or calculus.

Each table in a relational database typically includes many "rows" of data, which is a individual record in a relational database. A relational database row is consists of a collection of field values that occupy specific columns of a database table. As an example, a database table for MP4 video attributes might contain the columns (Video_Name, Video_Framerate, Movie_Script_Name) and contain a row with column field values: ("Roger Rabbit MP4 video.mp4", "25 FPS", "Who Shot Roger Rabbit.doc"). A relational database table will typically include a primary key (PK), which defines a column (or combination of columns) within the relational database table whose values together form the "principal unique identifier" for each specific row within that table. A table's PK serves to uniquely identify a row in that table, e.g., the name of the video in the above example.

A foreign key (FK) is a column (or combination of columns) whose values match those of a primary key in the same or different relational database table. A given foreign key value represents a reference from the row(s) containing the foreign key to the specific row containing the matching primary key value. The problem of ensuring that every foreign key value does in fact match a value of the corresponding primary key is known as the referential integrity problem.

Referential integrity is the consistency or reference integrity between coupled tables in a relational database. Referential integrity is usually enforced by the combination of a PK (or candidate key/alternate key) and a FK. For referential integrity to be true, any field(s) in one or more rows of a table that are declared to be a foreign key must contain only values from a parent table's primary key or candidate key; e.g., deleting a record that contains a value referred to by a FK in another table would break referential integrity. A relational database management system (RDBMS) enforces referential integrity, normally either by deleting the FK rows as well to maintain integrity, or by returning an error and not performing the deletion command. The method used can be determined by the referential integrity constraint, as defined in the data dictionary.

Most commonly, referential integrity is used to ensure that a row cannot exist in one table without the existence of a related row in another (or the same) table. For example, an order cannot exist in an Orders table without a corresponding customer record row in a Customers table. It also ensures that data cannot be altered in a way that would defeat the established relationships. Again, a record row in the Customer table could not be deleted without deleting all of the related rows in the Order table, as well as any other related dependent table.

With the development of the semantic Web, a new kind of storage technology, called a triplestore, is being used more often. In a triplestore, one stores triples. A triple is an expression or mathematical n-tuple consisting of three elements: a subject, a predicate, and an object typically written as (S, P, O). For example, the triple ("Roger Rabbit MP4 video.mp4", "has_script", "Who Shot Roger Rabbit.doc"), and the triple ("Roger Rabbit MP4 video.mp4", "has_framerate", "25 FPS") indicates that video content file for Roger Rabbit has associated with it a movie script named "Who Shot Roger Rabbit.doc" and a framerate attribute with a value of 25 frames per second.

Such triple statements are essentially assertions that may or may not be true, but as one learns information about the correctness of the assertions, one can begin to do inferencing or reasoning about the information in a triplestore. A triplestore is a special-purpose database for the storage and retrieval of triples. Specifically, an RDF triplestore uses the W3C (World Wide Web Consortium) nomenclature and semantics defined by the Resource Description Framework (RDF) for metadata. Similar to relational databases, metadata saved in the triplestore is retrieved via a query language. Unlike relational databases, triplestores are optimized for the storage and retrieval of many short statements or triples. As such, a triplestore may contain billions of such triples and standard methods exist to measure the performance of a particular triplestore, such as the Lehigh University Benchmark (LUBM).

SUMMARY

This specification describes technologies relating to conversion of relational databases into triplestores.

In general, one innovative aspect of the subject matter described in this specification can be embodied in methods that include the actions of retrieving meta schema information for a relational database, including checking a data dictionary associated with the relational database, and saving the meta schema information in a canonical format, the saved meta schema information including column definitions, primary key constraint definitions and foreign key constraint definitions obtained from the data dictionary; processing the saved meta schema information to identify triples to be created in a triplestore; and generating triples in the triplestore in accordance with results of the processing, the generating including: creating first triples using the column definitions, the first triples corresponding to data specified within tables in the relational database, creating second triples using the primary key constraint definitions and the foreign key constraint definitions, the second triples corresponding to data links between the tables in the relational database, and creating third triples using at least one of the primary key constraint definitions, at least one of the foreign key constraint definitions, and an associative mapping table corresponding to the relational database; where the retrieving and saving, the processing, and the generating are performed by one or more data processing apparatus. Other embodiments of this aspect include corresponding systems, apparatus, and computer programs, configured to perform the actions of the methods, encoded on computer storage devices.

These and other embodiments can each optionally include one or more of the following features. Retrieving and saving can include reading names of table views to be mapped from the relational database, reading definitions of columns for each table to be mapped from the relational database, saving a definition for each table to be mapped from the relational database, saving primary key, foreign key and alternate key definitions for tables to be mapped from the relational database, and saving definitions of primary key, foreign key and alternate key constraints for tables to be mapped from the relational database.

The processing can include building a schema metamodel graph for the relational database, the schema metamodel graph including an expansion list for each table to be mapped from the relational database and a graph adjacency list indicating connections between rows of different tables through primary key to foreign key relationships. The processing can additionally include traversing the schema metamodel graph for the relational database to preserve referential integrity rules with respect to the relational database, the traversing including: expanding table rows including expanding a given row into individual triples, each of the individual triples having a subject including primary-key information from the given row, a predicate including column name information from the given row, and an object including non-primary-key information from the given row, determining mapping structures for primary key to foreign key and alternate key to foreign key pairs in accordance with a canonical mapping template, normalizing keys to support collation and sorting, and creating intermediate associative map triple-entities to maintain source-destination mappings when one-to-many or many-to-many primary key to foreign key relationships are present. The generating can include re-traversing the schema metamodel graph and, for each edge in the schema metamodel graph: creating RDF-triplestore link triples to represent each primary key to foreign key and alternate key to foreign key relationship, and storing each new RDF-triplestore link triple in the triplestore.

Method operations can include creating inverse triples based on information found in the data dictionary associated with the relational database and creating inverse triples based on information found in relational query optimizer statistics retrieved from a relational database management system of the relational database.

Moreover, a system can include a user device; a relational database management system; and one or more computers operable to interact with the device and the relational database management system to perform operations of the method. The one or more computers can include a server operable to interact with the device through a data communication network, and the device can be operable to interact with the server as a client. Alternatively, the one or more computers can consist of one computer, the device can be a user interface device, and the one computer can include the user interface device.

Particular embodiments of the subject matter described in this specification can be implemented so as to realize one or more of the following advantages. Historical datasets in relational databases can be transitioned to triplestores, where inferencing and reasoning operations can be performed on the data more readily. Existing metadata stored as table rows within a relational database can be automatically described, mapped and migrated into triples in a triplestore (e.g., without the need for a database designer or data modeling engineer to examine the relational database and manually determine what records need to be mapped and how to do the mapping). The process used to perform such a transition from a relational database to a triplestore can also include method(s) that operate on many types of input data models. For example, semantic models of metadata expressed using entity-relationship, relational and XML (eXtensible Markup Language) or XMP (Extensible Metadata Platform) data models can be pulled into a common semantic model, and a set of algorithms can be used to transform the data in the common semantic model into triples for storage in an RDF triplestore.

A relational database can be preprocessed to collect primary and foreign key information, schema metamodel elements can be created to determine appropriate mappings between the relational tables and RDF triples, a full schema metamodel including PF/FK relationships can be constructed, a table to triple expansion pass can be performed for each table in the schema metamodel, and (FK,PK) triples can be generated and saved for each table element of the schema metamodel encountered in a second pass. Two separate passes can be performed instead of one, which can result in simplified processing when multiple FKs reference the same parent table PK.

Relational database schema and instance data can be migrated into an RDF triplestore (e.g., to take advantage of indexing or semantic inferencing capabilities of the underlying triplestore) in an automated fashion, without employing a manual process of migrating model, schema, and data. In particular, a relational database can be preprocessed to gather information needed for the schema metamodel, a comprehensive schema metamodel can be built to represent the underlying relational database, and a set of algorithms can be employed to process the schema metamodel in order to transform the underlying relational database into an RDF graph of RDF triples. Moreover, the process that transitions relational database data into a triplestore can employ an optimal mapping to the triplestore representation such that every statement that could be extracted from a given relational record gets turned into an explicit (S, P, O) triple in the triplestore. Furthermore, creation of inverse links in the triplestore being populated can be influenced so as to optimize the performance and storage requirements of the triplestore. In one example, the migrated relational database data may represent web resource information. The graph-oriented data structure of web resources translates well to RDF triplestore formatting; thus a migration of web resource information from relational database format to RDF triplestore format can be advantageous in query performance enhancement.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
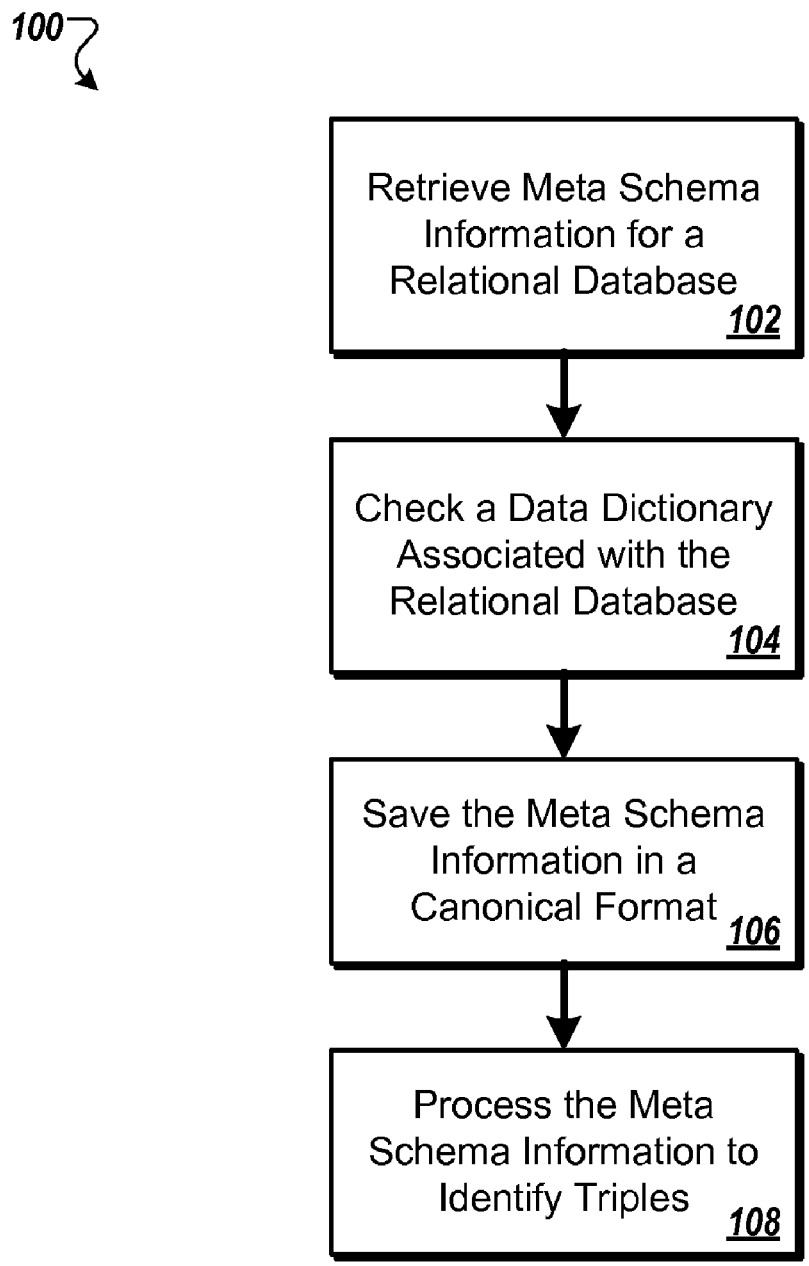
FIGS. 1A and 1B show examples of processes to convert a relational database into a triplestore.
Figure 1B:
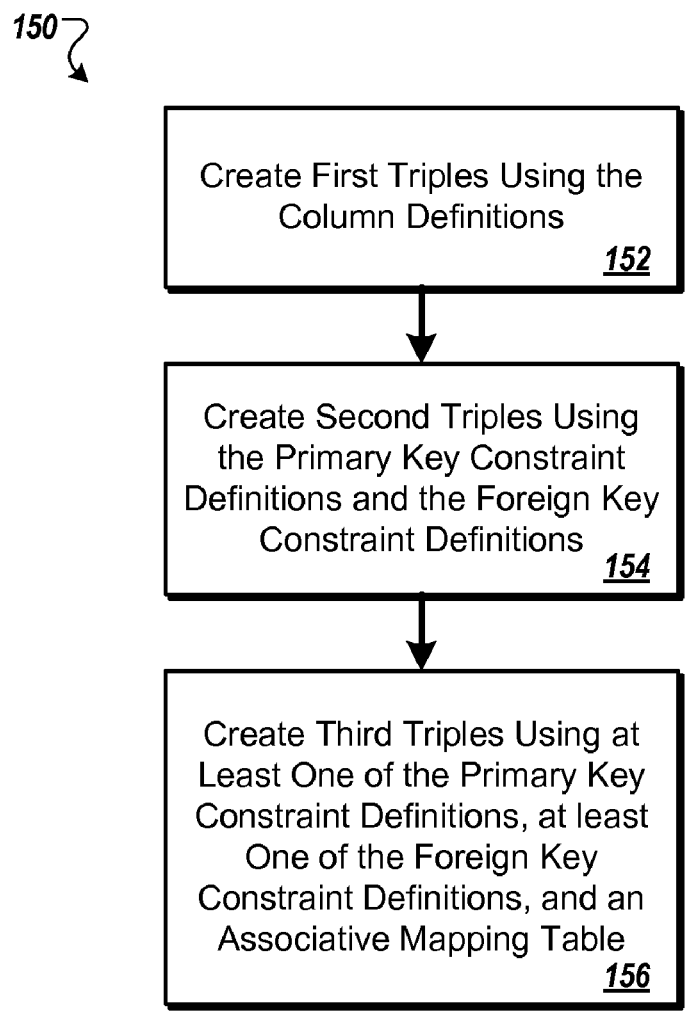

FIGS. 1A and 1B show examples of processes to convert a relational database into an RDF triplestore. Given a relational database, an automated mapping of the database tables and relationships to an RDF triplestore can be generated by analyzing the self-describing structure of the relational database. Through analyzing information obtained from the relational database meta schema, the data dictionary, and the column structure of the database tables, for example, a set of RDF subject, predicate, and object relationships may be inferred. RDF triples can then be automatically generated and populated within an RDF triplestore based upon the inferred relationships. In some implementations, the conversion process can be performed to automate the migration of a complete relational database to an RDF triplestore database. Only a portion of a relational database, in other implementations, may be migrated to an RDF triplestore database format, for example, to enable inferencing analysis upon a subset of the data contained within the relational database while continuing to maintain the active relational database.

As shown in FIG. 1A, a process 100 for converting a relational database into a triplestore framework begins with retrieving meta schema information for a relational database (102). The meta schema can contain the rules and regulations determined by the database administrator when establishing the relational database. For example, the meta schema may include information regarding accepted data types, maximum hierarchical levels within the database, default values associated with one or more attributes, or requirements regarding the naming constraints of schema components. The meta schema can provide a basis on which to understand the underlying database model. In some implementations, the meta schema may be a standard meta schema document associated with a particular RDBMS (e.g., Oracle Database by Oracle Corporation of Redwood Shores, Calif., IBM DB2 by IBM Corporation of Armonk, N.Y., etc.) which the process can have stored locally as reference material. In other implementations, the meta schema may be a custom meta schema document (e.g., defined by a database administrator) which the process may import from the RDBMS. The meta schema can additionally include a data dictionary describing a particular instance of a database schema.

A data dictionary associated with the relational database is checked (104). The data dictionary defines the structure of the contents of the relational database or a collection of relational databases including, but not limited to, table definitions, field (e.g., column) definitions, relationships between data fields (e.g., primary key), relationships between tables (e.g., foreign key, alternate key), and the formatting type and length of each data field.

The meta schema information is saved in a canonical format (106). The meta schema and data dictionary contents and formatting can differ between RDBMS products. For each table, the column names can be represented in a query-ready form. The data type(s) may be converted or normalized, in some implementations, to generate printable or human-readable values. All key information may be presented in a consistent manner. The primary key to foreign key constraint language, for example, can be normalized to a form which may be algorithmically processed. If no primary key is defined, a primary key may be inferred (e.g., using an "ID" or "identification" field or other heuristics which suggest a unique identifier). The table, column, primary key, foreign key, alternate key, and other supporting information, thus retrieved and organized, can then be stored within a generic format appropriate for processing to identify triples.

The meta schema information is processed to identify triples (108). Beginning with a relational database table definition, for example, subject, predicate, and object relationships can be determined between the columns of the table. For example, the primary key column(s) can relate to a subject. The primary key can be considered as the Universal Resource Identifier (URI) of the formed triple. Each remaining column, in turn, can relate to an object. Descriptive information within the data dictionary can provide information regarding predicate terminology (e.g., the relationship between the subject and the object). In other implementations, predicate information can be inferred.

Considering the foreign key or alternate key definitions, triples can be identified that link tables. In this case, the primary key of the table in which the foreign key is defined can relate to a subject, and the primary key of the table which the foreign key references can relate to an object. In some implementations, descriptive information within the data dictionary can provide information used as predicate terminology. In other implementations, a predicate can be constructed (e.g., Table1Name_has_Table2Name).

An associative mapping structure within the data dictionary or other meta schema information can be used to identify triples within data which has a many-to-many mapping. For example, within a university library database, a first table may list students and a second table may list books. An associative mapping structure may provide the linkage describing which students have read which books. The identified triple, for example, may be written as (Student_Name, has_read, Book_Title). In other implementations, if an associative mapping structure is not explicitly stated, but may be implicitly inferred, the relational database can be queried to generate records (relational pairs) which may be mapped to triple format.

In some implementations, other triples can be generated to improve query processing speed. For example, an inverse mapping may be made of one or more triples by swapping the subject and the object. In this example, the triple (Book_title, read_by, Student_Name) can be generated by constructing the inverse of the associative triple (Student_Name, has_read, Book_Title) and generating an inverse predicate which linguistically mirrors the original predicate.

In another example, triples can link to other triples through a method known as the entailment regime. For example, the triple (Student_Name, has_read, Book_Title) links to the triple (Book_Title, has_author, Author_Name). A direct link between Student_Name and Author_Name, in this example, can be created to more quickly determine which students have read which authors using the triple (Student_Name, has_read author, Author_Name). Direct linkage triples may be desirable, for example, if it is anticipated that the information pairing will be associated with a high number of requests. In some implementations, query history logs can be statistically analyzed within the RDBMS to determine which additional triples to generate. Some RDBMS systems may already contain gathered query statistics which may be analyzed. For example, the meta schema data can include one or more documents describing historical query analysis. The query analysis data, in some implementations, can be normalized and processed to be used in determining additional triples which may be beneficial to generate.

As shown in FIG. 1B, a process 150 for generating triples in a triplestore begins with creating first triples using the column definitions (152). For each row of a relational database table, using the triple definitions derived through the process outlined within FIG. 1A with relation to the primary key and the remaining non-constraining columns of the table (e.g., not FK or AK), expand the row into triples. For example, if the row contains a primary key and three additional columns (A, B, C), expand the row into a first triple (PK, relationship, A), a second triple (PK, relationship, B), and a third triple (PK, relationship, C). The triples can be stored within the RDF Triplestore DBMS or within a temporary storage location (e.g., one or more data files which may in turn be used to populate an RDF triplestore database). Each table within the relational database can in turn be traversed, expanding each row of each table into triples.

Second triples are created using the primary key (PK) constraint definitions and the foreign key (FK) constraint definitions (154). Where FK:PK references link using a one-to-one reference, the FK:PK pairs can be directly translated into RDF triple format. For each table in which a FK (or AK) reference exists, traverse the table rows, expanding the FK:PK pair into triples in the format (FK, relationship, PK) which link the referencing table to the table referenced by the foreign key. Each new link triple can be stored within the RDF Triplestore DBMS or within a temporary storage document.

Third triples are created using at least one of the PK constraint definitions, at least one of the FK constraint definitions, and an associative mapping table (156). Where one-to-many or many-to-many PK:FK relationships exist, for example, triple entries can be generated which maintain the relationship mappings. If no associative mapping table exists, RDF triples can be generated using query response records which contain the associative pairs.

In some implementations, the data including the subject (URI) of each triple may be normalized for collation and sorting during triple generation. For example, if the primary key of the relational database table is generated through the concatenation of two or more columns, the resultant compound URI can be normalized to contain a single data type which may be capable of sorting, collating, or being read by a human.

Although the processes 100 and 150 have been described in relation to triples, in some implementations, the processes 100 and 150 can be used to generate additional information. For example, each triple can be modified to introduce a context element, generating a quad-formatted record (S, P, O, C).

Figure 2:
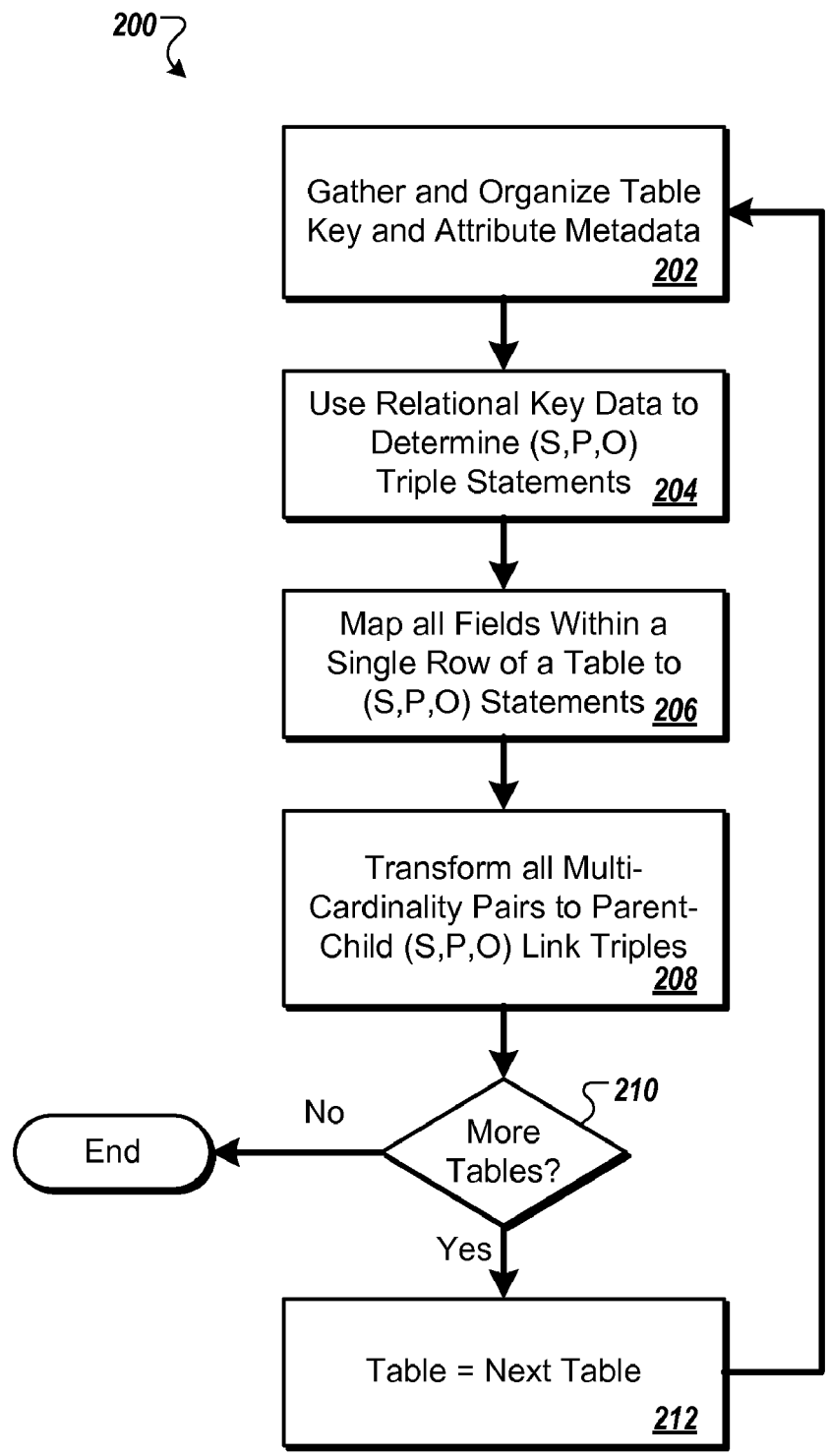
FIG. 2 shows another example of a process of converting a relational database into a triplestore.

FIG. 2 shows another example of a process 200 of converting a relational database into a triplestore. The process, for example, can be used to perform an automatic mapping between a relational database and an RDF triplestore through analyzing the contents of the relational database metadata. The process 200 begins with gathering and organizing metadata regarding table keys and attributes (202). For example, meta schema, table metadata, and/or data dictionary information can be analyzed to collect table and view names, table column definitions, and relational constraint definitions (e.g., FK, PK, AK). In some implementations, the information collected can be reorganized to construct one or more data dictionary tables in a generic format. In other implementations, the information can be gathered and structured into another generic canonical format, such as a canonical format that indicates the names of tables, the columns that form each table, table constraints (e.g., referential integrity constraints), and the columns that form each PK, FK and AK which are used to define the referential integrity constraints. The generically formatted information, for example, can be used later for processing the relational database table to derive RDF triple definitions. An example metadata organization is illustrated in the subschema 300 of FIG. 3A.

The relational key data is used to determine subject, predicate, object (S, P, O) triple statements (204). For example, the collected data can be read to determine which column(s) of the table form the PK and thus can be used as the URI of each resultant triple. Any column(s) within the table which act as a FK can be used for linking triples together and for preserving referential integrity. The relationships described by the PK:FK pairings can be stored as RDF predicate information. The derivation and assignment of RDF predicates is described in further detail in relation to FIG. 3B.

All fields within a single row of the table are mapped to (S, P, O) statements (206). For example, the PK column(s) of a table can be systematically mapped to each non-constraint column of the table (not PK, FK, or AK). The PK becomes the subject, the non-constraint column becomes the object, and the relationship between the two becomes the predicate. The mapping of (S,P,O) triples within a single row of a table is described in further detail in relation to FIG. 4.

All multi-cardinality pairs are transformed to parent-child (S, P, O) link triples (208). For example, the PK column(s) within a single row of the table can be mapped to any FK or AK references within the row. The relationship between the two becomes the predicate. In some implementations, the predicate can be inferred from metadata or information within the data dictionary. In other implementations, the predicate can be automatically assigned. For example, if the referenced table is Table Box and the referencing table is table Crayons, the predicate assigned may be "Box_has_Crayon". The mapping of multi-cardinality pairs to link triples is described in further detail in relation to FIG. 5.

If the multi-cardinality pairs are linked in a one-to-many or many-to-many manner, in some implementations an associative table can be generated to map the associations between the two tables. For example, if the table Box has a one-to-many mapping with the table Crayons a 1:N (Box:Crayons) associative table can be generated to illustrate this association. The use of associative tables in resolving one-to-many or many-to-many associations is described in further detail in relation to FIG. 6.

If there are additional tables within the relational database (210), the process 200 proceeds with processing the next table (212).

Figure 3A:
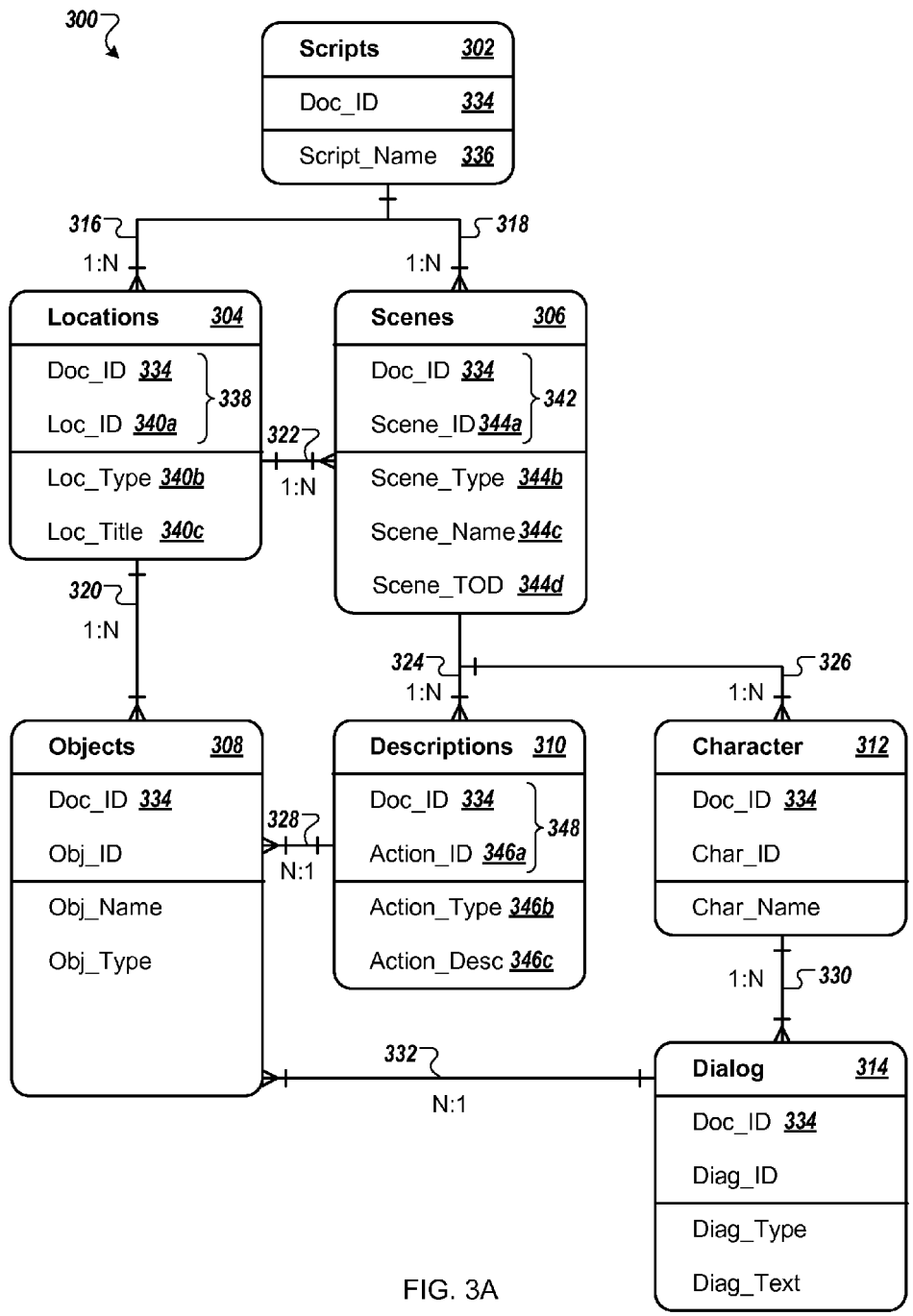
FIGS. 3A and 3B show an example relational database subschema and an underlying relational schema metamodel.

FIG. 3A shows an example relational database subschema 300. The subschema 300 models the relationships (parent-child or master-detail) between seven tables within a relational database through linking the seven tables. These links, for example, may model PK:FK or PK:AK relationships within a relational database. The subschema 300 may have been built during the process of converting a relational database to an RDF triplestore database. The tables are illustrated as having one-to-many (or, reflectively, many-to-one) connections. In other implementations, one or more tables can be connected in a one-to-one or a many-to-many manner. The tables, for example, can describe various elements within a movie script.

The subschema 300 includes a Scripts table 302, a Locations table 304, a Scenes table 306, an Objects table 308, a Descriptions table 310, a Character table 312, and a Dialog table 314. Each table includes exemplary column attributes. For example, the Scripts table 302 includes a Doc_ID column 334 and a Script_Name column 336. The Doc_ID column 334, for example, may be the PK field of the Scripts table 302.

The Scripts table 302 is connected to the Locations table 304 by a one-to-many link 316. This relationship suggests that there are many locations (e.g., scene settings) involved within a single movie script. The Doc_ID column 334 within the Locations table 304, for example, may serve as the FK linking the Locations table 304 to the Scripts table 302. The PK 338 of the Locations table 304, for example, may include the combined information within the Doc_ID column 334 and a Loc_ID column 340*a*.

The Scripts table 302 is also connected to the Scenes table 306 by a one-to-many link 318. This relationship suggests that there are many scenes involved within a single movie script. The Doc_ID column 334 within the Scenes table 306, for example, may serve as the FK linking the Scenes table 306 to the Scripts table 302. The PK 342 of the Scenes table 304, for example, may include the combined information within the Doc_ID column 334 and a Scene_ID column 344a.

The Locations table 304 is connected to the Scenes table 306 by a one-to-many link 322. This relationship suggests that one or more scenes may be shot at each location. The FK element connecting the Scenes table 306 to the Locations table 304 is not illustrated.

The Locations table 304 is connected to the Objects table 308 by a one-to-many link 320. This relationship suggests that one or more objects (e.g., furniture, landmarks, vehicles, or other props) can be involved at each location. The Objects table 308 is connected to the Dialog table 314 by a one-to-many link 332. This relationship suggests that one or more objects can be the topic of a discrete section of dialog.

Returning to the Scenes table 306, a one-to-many link 324 connects the Scenes table 306 to the Descriptions table 310. This relationship suggests that one or more action sequences can occur within a given scene. The descriptions table 310 is, in turn, connected to the objects table 308 by a one-to-many link 328, because there may be one or more props involved within a given action sequence.

The Scenes table 306 is connected to the Character table 312 by a one-to-many link 326. Each scene can involve one or more characters. The Character table 312, in turn, is connected to the Dialog table 314 by a one-to-many link 330. Each character may have one or more lines of dialog.

Figure 3B:
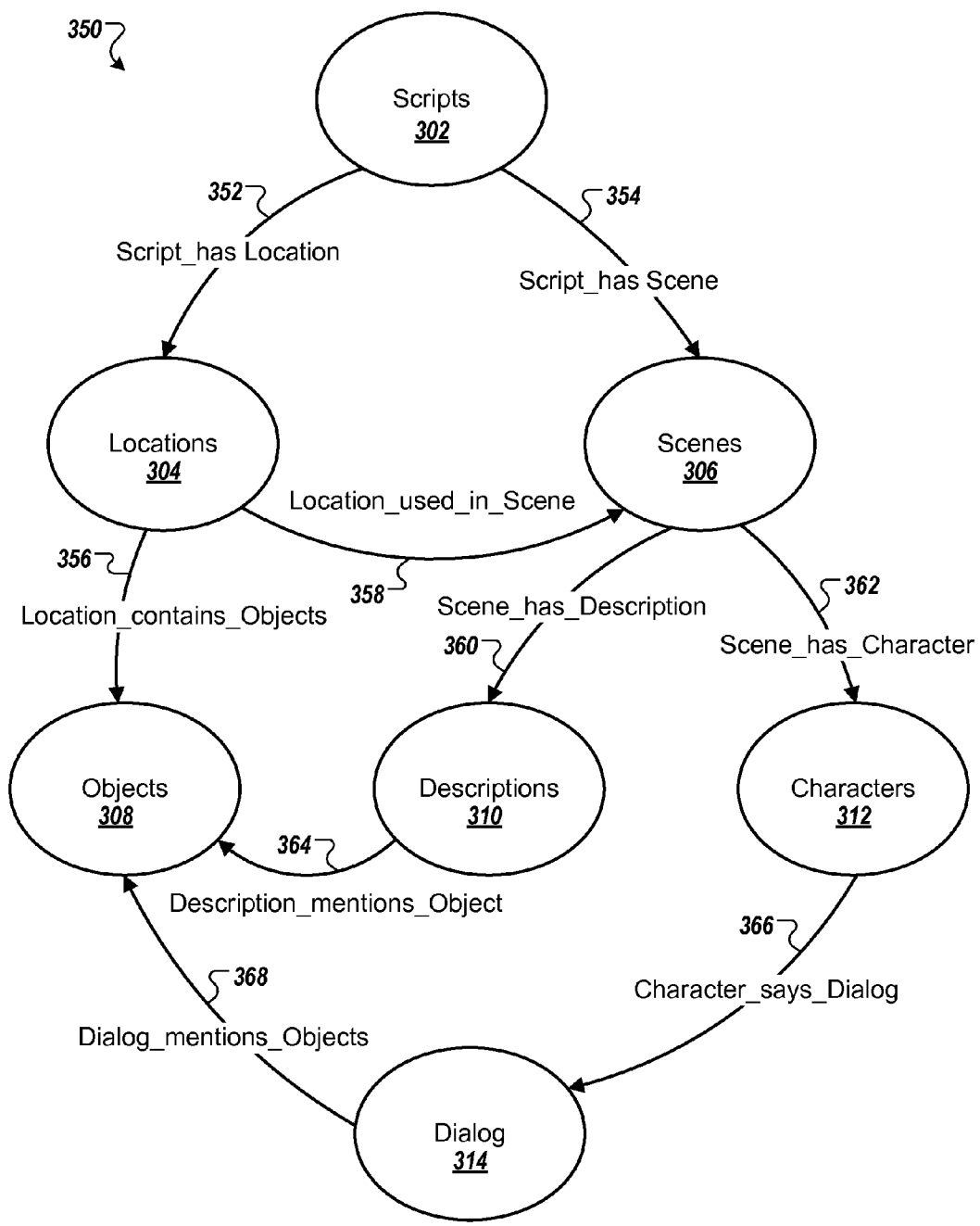

FIG. 3B shows an example underlying relational schema metamodel 350. The metamodel 350, for example, can be derived from the subschema 300 as described in FIG. 3A. The metamodel 350 illustrates exemplary predicate relationships between the tables 302 through 314. These predicate relationships, in some implementations, can be derived from the relationship links 316 through 322 as illustrated in FIG. 3A.

The Scripts table 302 is linked to the Locations table 304 by a Script_has_Location predicate link 352. The Scripts table 302 is also linked to the Scenes table 306 by a Script_has_Scene predicate 354. The Locations table 304 is connected to the Scenes table 306 by a Location_used_in_Scene predicate link 358. The Locations table 304 is also connected to the Objects table 308 by a Location_contains_Objects predicate link 356.

The Scenes table 306 is linked to the Descriptions table 310 by a Scene_has_Description predicate link 360. The Scenes table 306 is additionally linked to the Characters table 312 by a Scene_has_Character predicate link 362.

The Descriptions table 310 is linked to the Objects table 308 by a Description_mentions_Object predicate link 364.

The Characters table 312 is linked to the Dialog table 314 by a Character_says_Dialog predicate link 366. The Dialog table 314 is, in turn, connected to the Objects table by a Dialog_mentions_Objects predicate link 368.

In addition to the illustrated predicate links 352 through 368, an expansion list (e.g., mapping) can be generated for each table 300 through 314 within the metamodel 350. The expansion list can be used to convert the N columns of each table 300 through 314 to M RDF triples. For example, the Locations table 304 can be mapped into an expansion list containing two triple formats, ((Doc_ID-Loc_ID) 338, has_type, Loc_Type 340b) and ((Doc_ID-Loc_ID) 338, has title, Loc_Title 340c).

The following is a general algorithm for calculating the number of entity triples M resulting from a relational database or subschema thereof, assuming each PK is described by a single column and each FK is described by a single column, $$M = \sum_{i=1}^{P} \sum_{j=2}^{N} |Ti| \text{ENTITY}(Ti.C1, Ti.Cj) \quad \text{Equation 1}$$

Where:

|Ti|=cardinality or number of rows (records) in table Ti
ENTITY(Ti.C1, Ti.Cj)=1 if an entity/attribute triple is to be created between the key field Ti.C1 and Ti.Cj, j>1 and j<=N
Ti.C1=PK
Ti.Cj=all non-key fields in a table (e.g., exclude PK, FK, AK)
N=total number of columns in table i
P=total number of tables A graph adjacency list can be created indicating which rows are connected to other rows through PK:FK relationships. The graph adjacency list can be used to convert the PK:FK relationships between the tables 300 through 314 to L number RDF triples. The Locations table 304, for example, is involved in three PK:FK relationships: one with the Scripts table 302, one with the Scenes table 306, and one with the Objects table 308. Each of these three PK:FK relationships can be modeled using three additional triple formats. The relationship between the Locations Table 304 and the Scripts table 302, for example, may be modeled using the triple mapping (Doc_ID 334, Script_has_Location, (Doc_ID, Loc_ID) 338).

As a general algorithm, the total number of link triples L evolving from a relational database or subschema thereof may be calculated as follows:

$$L = \sum_{i=1}^{P} \sum_{j=2}^{R} |Ti| \text{LINK}(Ti.Cj) \quad \text{Equation 2}$$

Where:

Ti=cardinality or number of rows (records) in table Ti
LINK(Ti.CJ)=1 if a triple is to be created between the FK field Ti.Cj and the PK of the parent table
Ti.Cj=FK field in table (all other columns excluded)
R=number of columns in table i
P=total number of tables The total number of triples resulting from a relational database formed from P tables and $$\sum_{i=1}^{P} |Ti|$$

total rows will have:

Total RDF triples=(M+L)

Although the above algorithms assume that each PK involves a single column and each FK or AK involves a single column, a similar but slightly more complex set of equations can be used to calculate the total number of triples when multi-column keys are used within the relational database.

Figure 4:
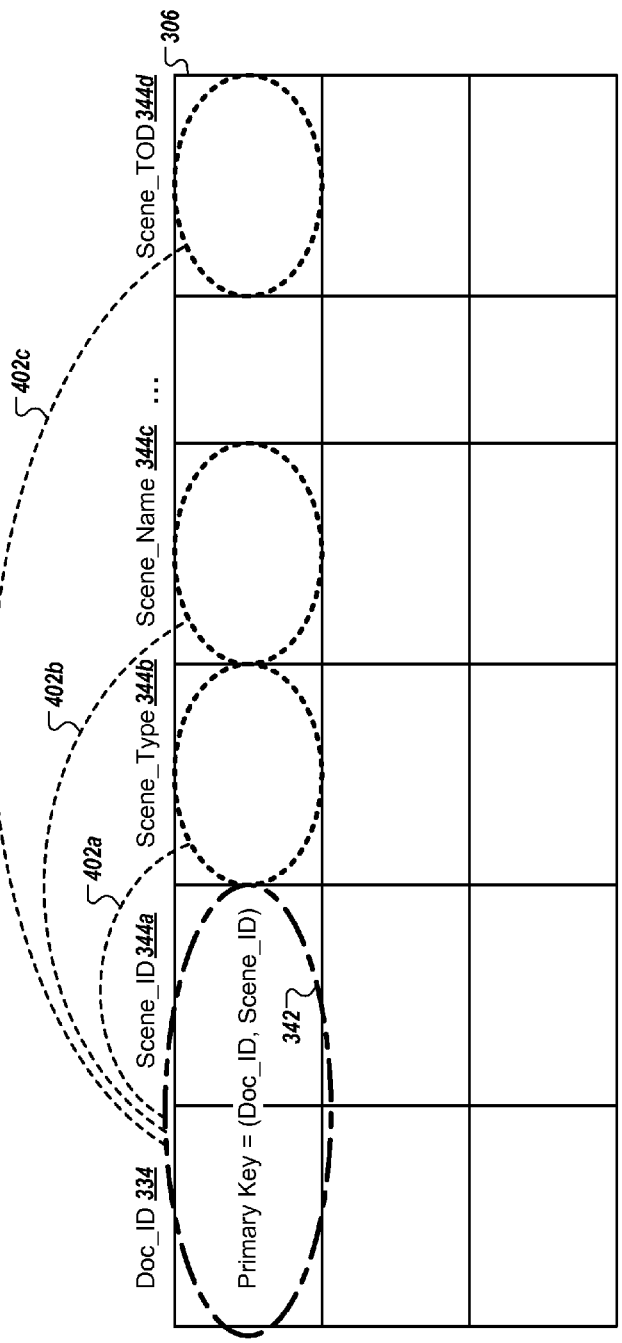
FIG. 4 shows an example table row to triple set mapping.

FIG. 4 shows an example table row to triple set mapping 400. The mapping 400 illustrates the generation of an expansion list of RDF triples 404 within the relational database table Scenes 306. The primary key 342 is linked to each non-relational column 344 (e.g., not a FK or AK) through a set of predicate links 402.

As shown in FIG. 4, a first predicate link 402a connects the primary key 342 to the column Scene_Type 344b. This linkage can generate a first triple expansion 404a of ((Doc_ID, Scene_ID), has_type, Scene_Type). A second predicate link 402b connects the primary key 342 to the column Scene_Name 344c. This linkage can generate a second triple expansion 404b of ((Doc_ID, Scene_ID), has_name, Scene_Name). A third predicate link 402c connects the primary key 342 to the column Scene_TOD 344d. This linkage can generate a third triple expansion 404c of ((Doc_ID, Scene_ID), has_TOD, Scene_TOD).

In some implementations, the mapping 400 is a visual representation of a more complex version of the first algorithm (Equation 1) as described in relation to FIG. 3B. The mapping 400, for example, can be applied to each row of the table Scenes 306 to generate a collection of RDF triples which represent the information contained within the table Scenes 306. If the table Scenes 306 includes one or more FK or AK references, these references can be used to generate additional linking triples representing a relationship between the table Scenes 306 and another table in the database.

Figure 5:
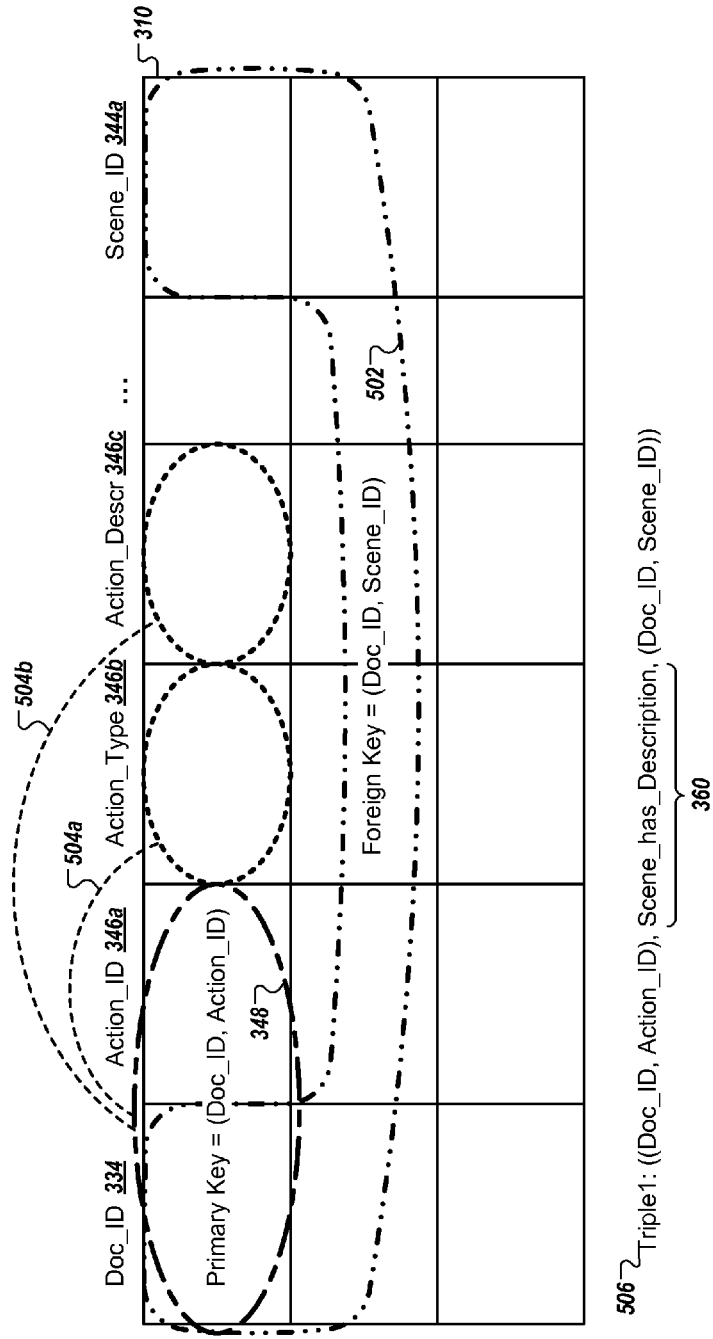
FIG. 5 shows an example table to triple PK/FK mapping.

FIG. 5 shows an example table to triple PK/FK mapping 500. The mapping 500 illustrates the generation of a graph adjacency list of RDF triples 506 within the relational database table Descriptions 310. In general terms, an expansion list is generated by identifying the PK plus all FK or AK references within a row of a table and determining the mapping structure between each PK:FK or PK:AK pair.

In a manner similar to that described in relation to FIG. 4, the expansion list of RDF triple mappings is illustrated through the primary key 348 connection to the column Action_type 346b by a first predicate link 504a and the primary key 348 connection to the column Action_Descr 346c by a second predicate link 504b.

In addition to the columns Action_Type 346b and Action_Descr 346c, a foreign key column Scene_ID 344a is illustrated within the table Descriptions 310. The combination of the column Doc_ID 334 and the column Scene_ID 310 creates a foreign key reference 502.

To generate a graph adjacency associated with the foreign key reference 502, the relationship between the FK reference 502 and the PK 348 is established. As illustrated in FIG. 3B, the predicate link 360 between the table Scenes 306 and the table Descriptions 310 is labeled "Scene_has_Description". Thus, the triple resulting from the relationship between the table Scenes 306 and the table Descriptions 310 can be described by the triple 506 ((Doc_ID, Action_ID), Scene_has_Description, (Doc_ID, Scene_ID)).

Figure 6:
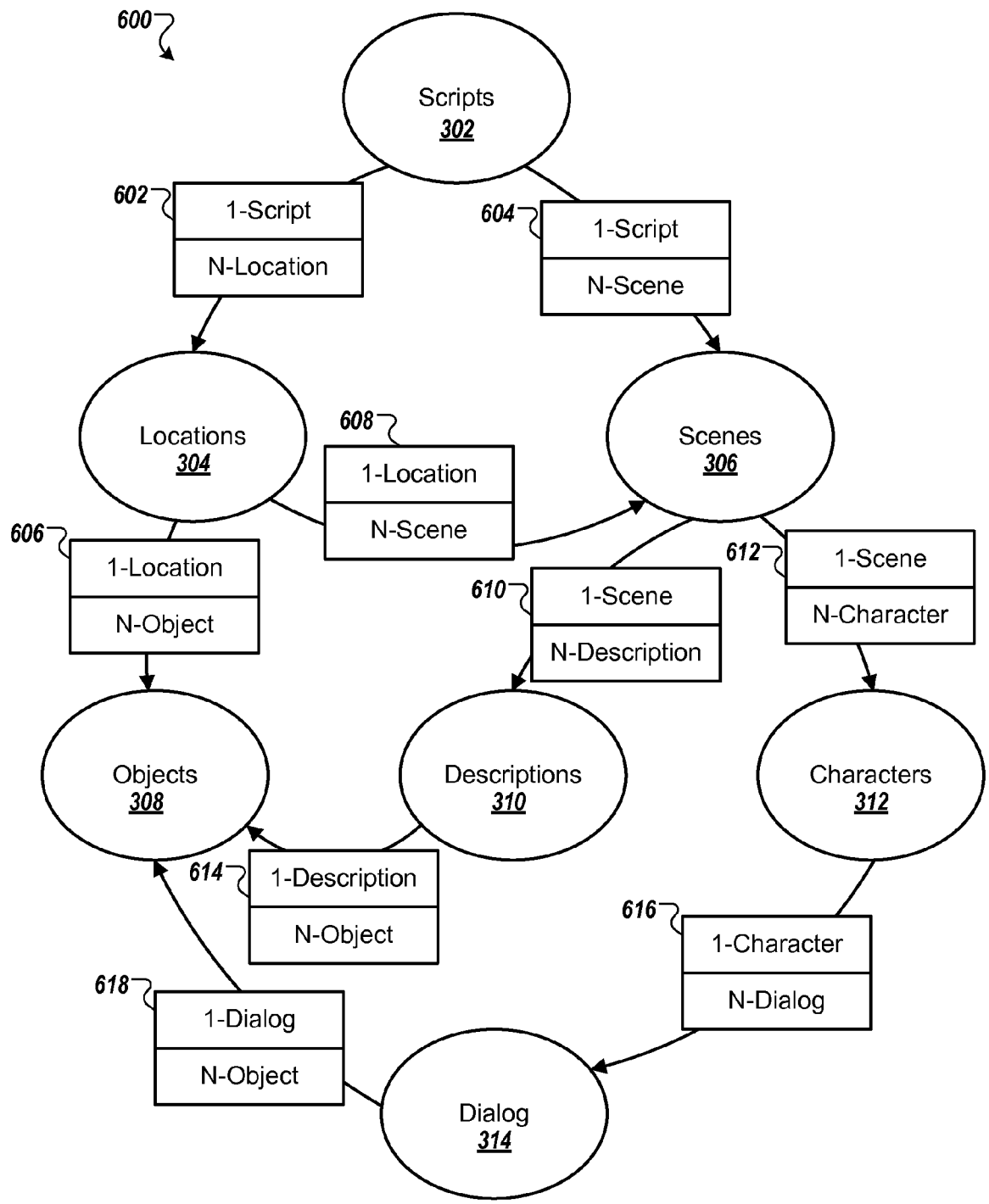
FIG. 6 shows an example of one to many, many to many PK:FK relationships.

FIG. 6 shows an example of a subschema metamodel 600 including one to many PK:FK relationships. The metamodel 600, for example, is based upon the metamodel 300 as described in relation to FIG. 3B. When FK or AK references between tables within a relational database describe a connection between a first row of a first table and more than one row of a second table or vice-versa, an intermediate associative map can be created to maintain parent-child or source-destination mappings. Referential integrity can be preserved through using an associative map to iterate over multiple connections when generating triples which represent the links between the two tables.

The metamodel 600 includes a first associative map 602 between the Scripts table 302 and the Locations table 304 associating one script with many locations. A second associative map 604 between the Scripts table 302 and the Scenes table 306 associates one script with many scenes. A third associative map 606 between the Locations table 304 and the Objects table 308 associates one location with many objects.

A fourth associative map 608 between the Locations table 304 and the Scenes table 306 associates one location with many scenes. A fifth associative map 610 between the Scenes table 306 and the Descriptions table 310 associates one scene with many descriptions. A sixth associative map 612 between the Scenes table 306 and the Characters table 312 associates one scene with many characters. A seventh associative map 614 between the Descriptions table 310 and the Objects table 308 associates one description with many objects. An eighth associative map 616 between the Characters table 312 and the Dialog table 314 associates one character with many lines of dialog. A ninth associative map 618 between the Dialog table 314 and the Objects table 308 associates a single line of dialog with many objects.

In addition to one-to-many associative table mappings, in other implementations, a many-to-one or many-to-many associative table can be established between two tables. For example, when taken in the reflexive sense, the table Characters 312 could be connected to the table Scenes 306 by an associative map which associates multiple characters to a single scene. In another example, a many-to-many associative map could be established between the Objects table 308 and the Scenes table 306, because many objects can be in a single scene, and some objects can be located within many different scenes.

Figure 7:
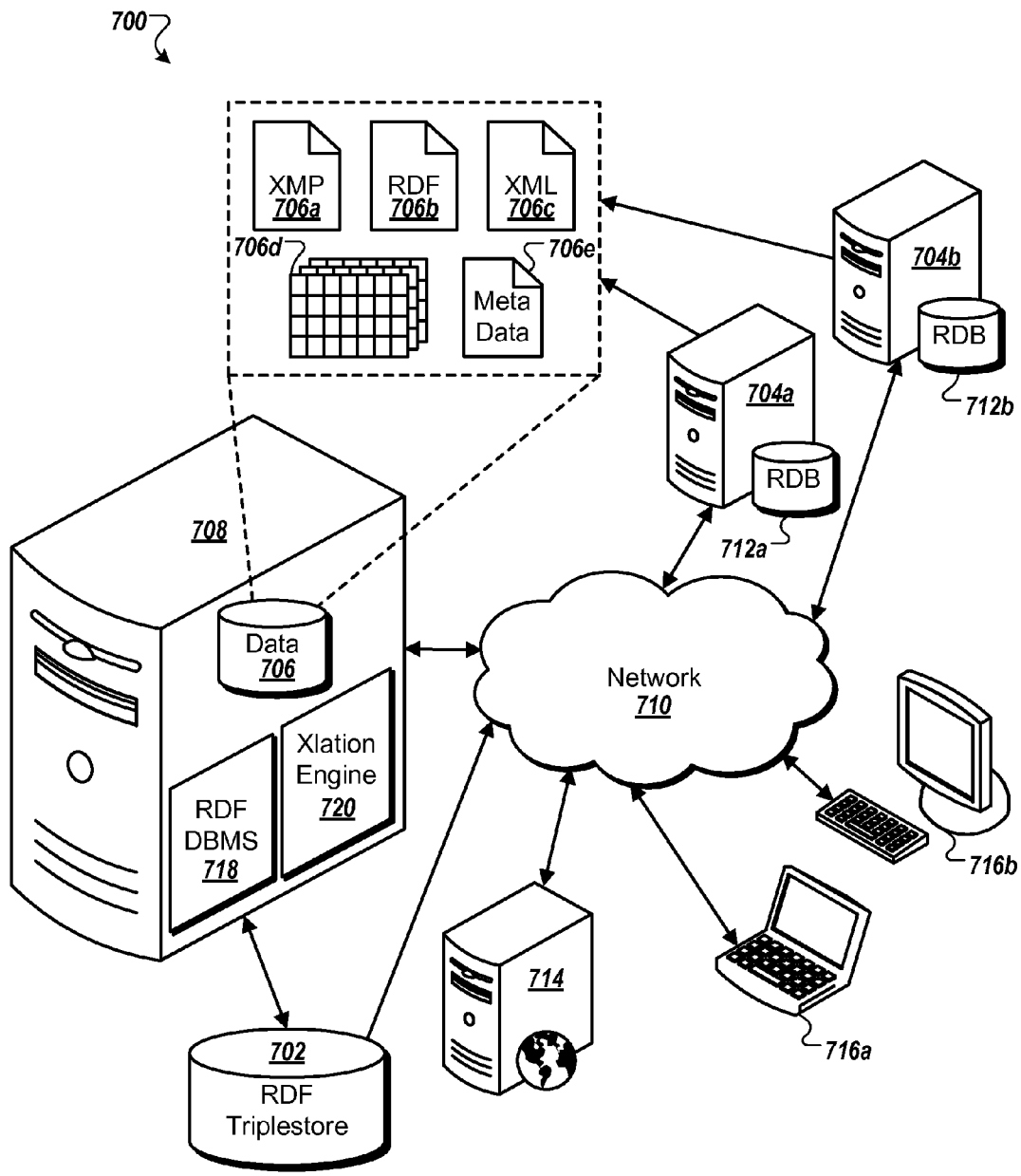
FIG. 7 shows an example system that populates an RDF triplestore from multiple data sources for use on a computer network.

FIG. 7 shows an example system 700 that populates an RDF triplestore 702 from multiple data sources for use on a computer network 710. A first relational database server 704a and a second relational database server 704b provide a set of data 706 to a processing server 708. The data, for example, can be duplicated from a first RDBMS 712a and a second RDBMS 712b. The processing server 708 can automatically translate the data 706 from relational database format to RDF triplestore format. The translated data is stored within the RDF triplestore 702. The RDF triplestore 702 can be accessed through the network 710 by a web server 714 or one or more client devices 716 such as a laptop client device 716a or a desktop client device 716b. Although the RDF triplestore 702 is illustrated as having a direct connection to the processing server 708, in some implementations the RDF triplestore 702 may be accessed by the processing server 708 via the network 710.

The processing server 708 can receive various electronic documents as input, each electronic document containing information regarding a portion of a relational database or an RDF triplestore database. For example, the data 706 can include relational database records, RDF triples, software tools, application data, media content, metadata or other information describing the organization of the database records (e.g., columns, tables, views), and metadata or other information describing the structure of the database in which the database tables, views, or records were created (e.g., RDBMS meta schema, RDF meta schema).

For example, the data 706 includes Extensible Metadata Platform (XMP) data 706a, RDF data 706b, and Extensible Markup Language (XML) data 706c, three forms of metadata which can be formally described using the Entity-Relationship Data Model as described by Peter Pin-Shan Chen. The XMP data 706a, RDF data 706b, and XML data 706c, for example, can be directly mapped into RDF triplestores by a direct element-by-element conversion or by using a Document Type Definition (DTD) mechanism or description mechanism such as RDF Schema by the World-Wide Web Consortium (W3C).

The data 706 also includes relational database data 706d and other metadata 706e. The other metadata 706e may be a type of metadata which can be described using the Entity- Relationship Data Model. In some implementations, the relational database data 706d contains the contents of relational database records, while the metadata 706e contains meta schema and database dictionary information describing a relational database structure. In some implementations, a translation engine 720, running within the processing server 708, can convert the relational database data 706d into triples by transforming them into an object modeling framework (e.g., a metamodel as described in relation to FIG. 3A), mapping the framework to RDF triple representations (e.g., as described in relation to FIG. 3B), and then converting the relational database data 706d into RDF triples (e.g., as described in relation to FIG. 4 and FIG. 5).

For example, the translation engine 720 can analyze a relational database structure, infer the triple expansion based upon PK, FK, and AK information plus definitions and other information stored within the relational database metadata or data dictionary, and build a schema metamodel of the relational database. Based upon the schema metamodel, for each table of the relational database, the translation engine 720 can determine triple mappings of PK:FK relationships to generate additional triple definitions. These linkage triples can be used, for example, to preserve referential integrity relationships expressed by the relational database. Once the triple mappings have been defined, the translation engine 720 can migrate the relational database records included within the relational database data 706d into RDF triples and store the RDF triples within the RDF triplestore 702. The translation engine 720, in some implementations, can provide information to an RDF DBMS 718 which stores the RDF triplestore information within the RDF triplestore 702.

The translated database can then be accessed by the web server 714 or one of the user devices 716a or 716b to query the information. For example, the web server 714 can supply one or more semantic Web applications for providing database information over the network 710 (e.g., to the users accessing the information through the user devices 716a and 716b). In some implementations, the web server 714 contains an RDF DBMS mechanism similar to the RDF DBMS 718 which can be used to query the RDF triplestore 702.

In some implementations, one or more elements of the system 700 can be implemented within a cloud computing system within or connected to the network 710. For example, the translation engine 720 can be implemented as a service provided by a virtual resource available through the network 710. The RDF Triplestore 702, in another example, can be queried by the user devices 716 through an RDF database management service (e.g., such as the RDF DBMS 718) available through the network 710. Other implementations are possible while remaining within the scope of the invention.

In some implementations, the relational database data 706d and the other metadata 706e may represent a complete migration of a relational database from the relational database servers 704a or 704b. In other implementations, the processing server 708 may receive a partial update of an active relational database model (e.g., contained within the relational databases 712a or 712b). For example, after migrating a relational database at a first point in time, the processing server 708 may receive additional relational database records or modified relational database records which can be translated and added to the RDF triplestore 702 to update the RDF triplestore database contents. The system 700 may continue to provide an active relational database along with an RDF triplestore copy of the database, for example, to provide greater query capabilities on all or a portion of the data records within the relational database while maintaining performance or storage advantages of a relational database model. An RDF triplestore copy of all or a portion of a relational database can be created, for example, to provide the capability of inferencing across the data. The RDF triplestore database model, for example, can provide query capabilities which may be awkward to accomplish using a traditional relational database model. In some implementations, the portion of the relational database migrated to RDF triplestore format can be based upon desired query ability (e.g., reasoning or inferencing over a specific portion of data). For example, the query history and statistics within the RDBMS 712a can be analyzed to determine which queries are frequently requested and which sections of the relational database could be migrated to an RDF triplestore format to improve the performance and speed of those queries.

In another example, an RDF triplestore version of a relational database can be generated to provide access to a particular type of desired query inferencing. Considering the subschema 300 modeled within FIG. 3A, different objects can have different copyright information associated with them. A movie studio may wish to present a query which determines which objects are owned by which copyright holders. For example, in the movie Who Shot Roger Rabbit, different cartoon characters are associated with different copyright holders. One exemplary query may request which cartoon characters are presented in which scenes (e.g., a relationship between the Objects table 308 and the Scenes table 306, which do not have an express linkage built between them). Another exemplary query may request which entities hold the most copyrights on the cartoon characters presented within the movie. The intuitive nature of this query may be better served using an RDF triplestore database than a relational database.

In some implementations, the query history and statistics within the RDBMS 712a or 712b can be analyzed to determine whether or not the creation of reverse linkages could improve query performance. In selectively implementing a partial RDF triplestore version of a relational database, the system 700 can reduce the overall storage requirements for the RDF triplestore version.

In some implementations, inverted indexes can be created for each slot of a triple (or quad). The presence of an index for each slot ensures fast retrieval of a given triple. For example, if binary tree mechanisms are employed, the access time can average approximately $O(\log(N))$ versus $O(N)$ for an RDF triplestore which does not employ a full index. However, full indexing within an RDF triplestore means that the triple data is redundantly stored within each index. The storage capacity required for full redundancy storage, for example, can be as much as four times the basic data size. As an example, a relational database which uses approximately four megabytes of storage, when converted to an RDF triplestore, can use approximately sixteen megabytes of storage when established with a single index, or thirty-two megabytes of storage when established with two indexes, and so on. The storage requirements approximately double with each index increment.

When triples are generated as links between parent and child triple objects (e.g., corresponding to a parent relational database row identified by a PK and a child relational database row identified by a FK), creating indexes over the individual (S), (O) slots can allow any parent triple to be quickly retrieved using the child triple, or vice versa. In some applications, inverse triple links are useful. In other cases, inverse links may not be beneficial. For example, in a postorder traversal of a tree graph (e.g., Root, A, B) explicit inverse links from child triples back to the parent triple is not beneficial.

In some implementations, the translation engine 720 can provide the ability to expressly select whether or not to create inverse linkages on a per-database, per-table, or per-FK level. For example, selective inverse link generation can improve query performance while selectively growing the overall size of the RDF triplestore storage needs.

Figure 8:
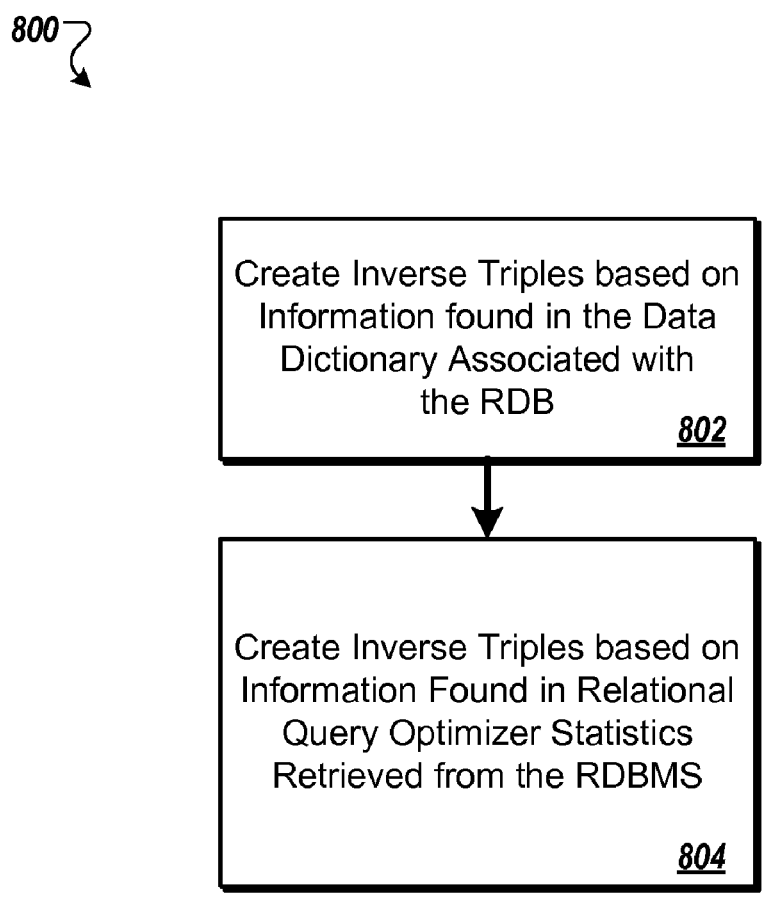
FIG. 8 shows an example process of generating inverse triples based on a metamodel of a given relational database.

FIG. 8 shows an example process 800 of generating inverse triples based on a metamodel of a given relational database. The process 800, for example, can be executed by the translation engine 720, as described in relation to FIG. 7, to create a reverse indexing mechanism between one or more relational database tables when translating those tables into an RDF triplestore format.

The process 800 begins with creating inverse triples based on information found in the data dictionary associated with the relational database (802). The metadata or data dictionary information corresponding to the relational database, for example, may store explicit associated index information (e.g., within the FK column or multi-column definition). If an associated index is defined within the relational database information, inverse triples can be generated for that PK:FK or PK:AK relationship.

Inverse triples are created based upon information found in the relational query optimizer statistics retrieved from the relational database management system (804). In some implementations, inverse triples can be generated on the basis of a perceived performance benefit through analyzing query optimizer statistics. For example, statistical PK value cardinality information provided in relation to a given FK column within the relational database can be used to determine the cost of the query with or without an inverse link. In a first example, if the PK column cardinality is high (e.g., many unique values), it may be beneficial to create an inverse link to accelerate queries originating at the child triple (e.g., using FKi:PK) as the index. For example, creation of an inverse link may improve query performance from O(N) to O(log(N)). In another example, if the PK column cardinality is low (e.g., few unique values), generation of a reverse link index may not improve performance. In this example, it may be estimated that a query from the child triple to the parent triple (e.g., using FKi:PK) may perform close to O(N) even after generation of the reverse link index.

In other implementations, inverse triples may be created based upon the frequency of queries which have a format of child triple to parent triple (FK:PK) request. For example, if analysis of the query optimizer statistics determines that users frequently submit queries which look up a location (e.g., within the Locations table 304) based upon an object or type of object (e.g., within the Objects table 308), then a reverse index linking the Objects table 308 to the Locations table 304 may improve query performance. The generation of the inverse triples, in some implementations, can be based upon a combination of first whether or not a perceived demand exists (e.g., frequency of queries) along with whether or not a perceived performance improvement exists (e.g., cardinality information). To generate inverse links, an (S,P,O) triple can be created for each relational parent:child record pair where S is the FK of the child record, and O is the PK of the parent record. For example, to generate the inverse links, the process 800 can iterate through the child records from i=1 to i=N, N being the total number of records, generating (FKi, inverse predicate, PK) triples. If the inverse links are generated based on information found within the data dictionary, the RDBMS metadata may include a definition which can be used as an inverse predicate. The inverse predicate can alternatively be generated to linguistically mirror the original predicate or, in other cases, a default predicate may be provided.

The process 800 may be executed during the migration process of a relational database to an RDF triplestore database or at some later point in time. For example, an active RDF triplestore database (e.g., which had been migrated from a triplestore database) can be enhanced by the process 800 to improve performance based upon observation of the performance of a set of queries against the RDF triplestore database. Only one of the steps of the process 800 may be used in some implementations. In other implementations, inverse triples may be generated based upon user preferences (e.g., all, none, or select).

The inverse triples, in further implementations, may be generated based upon analyzing anticipated RDF triplestore queries. For example, an RDF triplestore version of a relational database may be created because a user has a set of pre-established queries to submit against the RDF triplestore database. The queries, for example, may relate to concepts which are difficult to query against a relational database and, thus, no historical RDBMS queries exist for statistical analysis. The query analysis, for example, could be done by hand, by the translation engine 720, or by another software application to determine which inverse triples may improve query performance.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
retrieving meta schema information for a relational database, including checking a data dictionary associated with the relational database, and saving the meta schema information in a canonical format, the saved meta schema information comprising column definitions, primary key constraint definitions and foreign key constraint definitions obtained from the data dictionary;
processing the saved meta schema information to identify triples to be created in a triplestore; and
generating triples in the triplestore in accordance with results of the processing, the generating comprising:
creating first triples using the column definitions, the first triples corresponding to data specified within tables in the relational database,
creating second triples using the primary key constraint definitions and the foreign key constraint definitions, the second triples corresponding to data links between the tables in the relational database, and creating third triples using at least one of the primary key constraint definitions, at least one of the foreign key constraint definitions, and an associative mapping table corresponding to the relational database;

where the retrieving and saving, the processing, and the generating are performed by one or more data processing apparatus.

2. The method of claim 1, where the retrieving and saving comprises:

reading names of table views to be mapped from the relational database;

reading definitions of columns for each table to be mapped from the relational database;

saving a definition for each table to be mapped from the relational database;

saving primary key, foreign key and alternate key definitions for tables to be mapped from the relational database; and saving definitions of primary key, foreign key and alternate key constraints for tables to be mapped from the relational database.

3. The method of claim 2, where the processing comprises building a schema metamodel graph for the relational database, the schema metamodel graph comprising an expansion list for each table to be mapped from the relational database and a graph adjacency list indicating connections between rows of different tables through primary key to foreign key relationships.

4. The method of claim 3, where the processing comprises traversing the schema metamodel graph for the relational database to preserve referential integrity rules with respect to the relational database, the traversing comprising:

expanding table rows including expanding a given row into individual triples, each of the individual triples comprising a subject including primary-key information from the given row, a predicate including column name information from the given row, and an object including non-primary-key information from the given row;

determining mapping structures for primary key to foreign key and alternate key to foreign key pairs in accordance with a canonical mapping template;

normalizing keys to support collation and sorting; and creating intermediate associative map triple-entities to maintain source-destination mappings when one-to-many or many-to-many primary key to foreign key relationships are present.

5. The method of claim 4, where the generating comprises re-traversing the schema metamodel graph and, for each edge in the schema metamodel graph:

creating RDF-triplestore link triples to represent each primary key to foreign key and alternate key to foreign key relationship; and storing each new RDF-triplestore link triple in the triplestore.

6. The method of claim 1, further comprising:

creating inverse triples based on information found in the data dictionary associated with the relational database; and creating inverse triples based on information found in relational query optimizer statistics retrieved from a relational database management system of the relational database.

7. A computer storage medium encoded with a computer program, the program comprising instructions that when executed by data processing apparatus cause the data processing apparatus to perform operations comprising:

retrieving meta schema information for a relational database, including checking a data dictionary associated with the relational database, and saving the meta schema information in a canonical format, the saved meta schema information comprising column definitions, primary key constraint definitions and foreign key constraint definitions obtained from the data dictionary;

processing the saved meta schema information to identify triples to be created in a triplestore; and generating triples in the triplestore in accordance with results of the processing, the generating comprising:

creating first triples using the column definitions, the first triples corresponding to data specified within tables in the relational database, creating second triples using the primary key constraint definitions and the foreign key constraint definitions, the second triples corresponding to data links between the tables in the relational database, and creating third triples using at least one of the primary key constraint definitions, at least one of the foreign key constraint definitions, and an associative mapping table corresponding to the relational database.

8. The computer storage medium of claim 7, where the retrieving and saving comprises:

reading names of table views to be mapped from the relational database;

reading definitions of columns for each table to be mapped from the relational database;

saving a definition for each table to be mapped from the relational database;

saving primary key, foreign key and alternate key definitions for tables to be mapped from the relational database; and saving definitions of primary key, foreign key and alternate key constraints for tables to be mapped from the relational database.

9. The computer storage medium of claim 8, where the processing comprises building a schema metamodel graph for the relational database, the schema metamodel graph comprising an expansion list for each table to be mapped from the relational database and a graph adjacency list indicating connections between rows of different tables through primary key to foreign key relationships.

10. The computer storage medium of claim 9, where the processing comprises traversing the schema metamodel graph for the relational database to preserve referential integrity rules with respect to the relational database, the traversing comprising:

expanding table rows including expanding a given row into individual triples, each of the individual triples comprising a subject including primary-key information from the given row, a predicate including column name information from the given row, and an object including non-primary-key information from the given row;

determining mapping structures for primary key to foreign key and alternate key to foreign key pairs in accordance with a canonical mapping template;

normalizing keys to support collation and sorting; and creating intermediate associative map triple-entities to maintain source-destination mappings when one-to-many or many-to-many primary key to foreign key relationships are present.

11. The computer storage medium of claim 10, where the generating comprises re-traversing the schema metamodel graph and, for each edge in the schema metamodel graph:

creating RDF-triplestore link triples to represent each primary key to foreign key and alternate key to foreign key relationship; and storing each new RDF-triplestore link triple in the triplestore.

12. The computer storage medium of claim 7, the operations further comprising:

creating inverse triples based on information found in the data dictionary associated with the relational database; and creating inverse triples based on information found in relational query optimizer statistics retrieved from a relational database management system of the relational database.

13. A system comprising:

a user device;

a relational database management system; and one or more computers operable to interact with the user device and the relational database management system and to perform operations comprising:

retrieving meta schema information for a relational database, including checking a data dictionary associated with the relational database, and saving the meta schema information in a canonical format, the saved meta schema information comprising column definitions, primary key constraint definitions and foreign key constraint definitions obtained from the data dictionary;

processing the saved meta schema information to identify triples to be created in a triplestore; and generating triples in the triplestore in accordance with results of the processing, the generating comprising:

creating first triples using the column definitions, the first triples corresponding to data specified within tables in the relational database, creating second triples using the primary key constraint definitions and the foreign key constraint definitions, the second triples corresponding to data links between the tables in the relational database, and creating third triples using at least one of the primary key constraint definitions, at least one of the foreign key constraint definitions, and an associative mapping table corresponding to the relational database.

14. The system of claim 13, where the retrieving and saving comprises:

reading names of table views to be mapped from the relational database;

reading definitions of columns for each table to be mapped from the relational database;

saving a definition for each table to be mapped from the relational database;

saving primary key, foreign key and alternate key definitions for tables to be mapped from the relational database; and saving definitions of primary key, foreign key and alternate key constraints for tables to be mapped from the relational database.

15. The system of claim 14, where the processing comprises building a schema metamodel graph for the relational database, the schema metamodel graph comprising an expansion list for each table to be mapped from the relational database and a graph adjacency list indicating connections between rows of different tables through primary key to foreign key relationships.

16. The system of claim 15, where the processing comprises traversing the schema metamodel graph for the relational database to preserve referential integrity rules with respect to the relational database, the traversing comprising:

expanding table rows including expanding a given row into individual triples, each of the individual triples comprising a subject including primary-key information from the given row, a predicate including column name information from the given row, and an object including non-primary-key information from the given row;

determining mapping structures for primary key to foreign key and alternate key to foreign key pairs in accordance with a canonical mapping template;

normalizing keys to support collation and sorting; and creating intermediate associative map triple-entities to maintain source-destination mappings when one-to-many or many-to-many primary key to foreign key relationships are present.

17. The system of claim 16, where the generating comprises re-traversing the schema metamodel graph and, for each edge in the schema metamodel graph:

creating RDF-triplestore link triples to represent each primary key to foreign key and alternate key to foreign key relationship; and storing each new RDF-triplestore link triple in the triplestore.

18. The system of claim 13, the operations further comprising:

creating inverse triples based on information found in the data dictionary associated with the relational database; and creating inverse triples based on information found in relational query optimizer statistics retrieved from a relational database management system of the relational database.

19. The system of claim 13, wherein the one or more computers comprise a server operable to interact with the user device through a data communication network, and the user device is operable to interact with the server as a client.

20. The system of claim 13, wherein the one or more computers consist of one computer, the user device is a user interface device, and the one computer comprises the user interface device.

* * * * *